US009584794B2

(12) United States Patent
Bruls et al.

(10) Patent No.: US 9,584,794 B2
(45) Date of Patent: Feb. 28, 2017

(54) DEPTH HELPER DATA (71) Applicant: KONINKLIJKE PHILIPS N.V., Eindhoven (NL)

(72) Inventors: Wilhelmus Hendrikus Alfonsus Bruls, Eindhoven (NL); Philip Steven Newton, Eindhoven (NL); Johan Cornelis Talstra, Eindhoven (NL); Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 195 days.

(21) Appl. No.: 14/387,775

(22) PCT Filed: Apr. 5, 2013

(86) PCT No.: PCT/IB2013/052725
§ 371 (c)(1),
(2) Date: Sep. 24, 2014

(87) PCT Pub. No.: WO2013/150491
PCT Pub. Date: Oct. 10, 2013

(65) Prior Publication Data
US 2015/0085070 A1 Mar. 26, 2015

Related U.S. Application Data (60) Provisional application No. 61/620,660, filed on Apr. 5, 2012.

(51) Int. Cl.
H04N 13/00 (2006.01)
(52) U.S. Cl.
CPC ..... H04N 13/0059 (2013.01); H04N 13/0022 (2013.01); H04N 13/0048 (2013.01); H04N 13/0062 (2013.01); H04N 2013/0081 (2013.01)

(58) Field of Classification Search
CPC .......... H04N 13/0059; H04N 13/0022; H04N 13/0048; H04N 13/0062
See application file for complete search history.

(56) References Cited

U.S. PATENT DOCUMENTS

2002/0021832 A1 2/2002 Dawson
2005/0078108 A1 4/2005 Swift et al.
(Continued)

FOREIGN PATENT DOCUMENTS

CN 1954606 A 4/2007

OTHER PUBLICATIONS

Stefanoski, Nikolce et al "Description of 3D Video Coding Technology Proposal" Disney Research, Zurich and Fraunhofer HHI, MPEG Meeting 2011.

Primary Examiner — Dave Czekaj
Assistant Examiner — Nam Pham (57) ABSTRACT

A hybrid transmission/auto-conversion 3D format and scheme for transmission of 3D data towards various types of 3D displays is described. In the decoder (20) a stereo-to-depth convertor (24) generates a depth map. In the 3D video signal additional depth information called depth helper data (DH-bitstr) is sparsely transmitted both in time (partial depths in time) and/or spatially (partial depth within the frames). A depth switcher (25) selects the partial depths based on an explicit or implicit mechanism for indicating when these are to be used or when the depths must be automatically generated locally. Advantageously disturbing depth errors due to said stereo-to-depth convertor are reduced by the depth helper data.

14 Claims, 4 Drawing Sheets (56) References Cited

U.S. PATENT DOCUMENTS

| | | |
|---|---|---|
| 2010/0166338 A1 | 7/2010 | Lee |
| 2010/0238264 A1 | 9/2010 | Liu et al. |
| 2011/0081042 A1* | 4/2011 | Kim .................. H04N 13/0022 382/100 |
| 2013/0107956 A1 | 5/2013 | Muijs et al. |

* cited by examiner

DEPTH HELPER DATA

CROSS-REFERENCE TO PRIOR APPLICATIONS

This application is the U.S. National Phase application under 35 U.S.C. §371 of International Application No. PCT/IB2013/052725, filed on Apr. 5, 2013, which claims the benefit of U.S. Provisional Patent Application No. 61/620,660, filed on Apr. 5, 2012. These applications are hereby incorporated by reference herein.

FIELD OF THE INVENTION

The invention relates to a 3D source device for providing a three dimensional [3D] video signal for transferring to a 3D destination device. The 3D video signal comprises first video information representing a left eye view on a 3D display, and second video information representing a right eye view on the 3D display. The 3D destination device comprises receiver for receiving the 3D video signal, and a stereo-to-depth convertor for generating a first generated depth map based on the first and second video information. The 3D source device comprises an output unit for generating the 3D video signal, and for transferring the 3D video signal to the 3D destination device.

The invention further relates to a method of providing a 3D video signal for transferring to a 3D destination device.

The invention relates to the field of generating and transferring a 3D video signal at a source device, e.g. a broadcaster, internet website server, authoring system, manufacturer of Blu-ray Disc, etc., to a 3D destination device, e.g. a Blu-ray Disc player, 3D TV set, 3D display, mobile computing device, etc., that requires a depth map for rendering multiple views.

BACKGROUND OF THE INVENTION

The document "Working Draft on MVC extensions for inclusion of depth maps—ISO/IEC/JTC1/SC29/WG11/N12351, December 2011 by Teruhiko Suzuki, Miska M. Hannuksela, Ying Chen" is a proposal of new amendments to ITU-T Rec. H.264|ISO/IEC 14496-10 for adding 3D video technologies to MPEG coded video transfer signals (further called the ISO proposal). The ISO proposal describes coding of audio-visual objects, in particular amendments to said ISO standard Part 10: Advanced Video Coding, regarding Multi View Coding (MVC) extensions for inclusion of depth maps in the video format. According to the amendment MVC extensions for inclusion of depth maps video coding are specified allowing the construction of bitstreams that represent multiple views with related multiple supplemental views, i.e. depth map views. Similar to multiview video coding, bitstreams that represent multiple supplemental views may also contain further sub-bitstreams that conform to the proposed specification.

According to the ISO proposal depth maps may be added to a 3D video data stream having first video information representing a left eye view on a 3D display and second video information representing a right eye view on the 3D display. A depth map at the decoder side enables generating of further views, additional to the left and right view, e.g. for an auto-stereoscopic display.

SUMMARY OF THE INVENTION

The ISO proposal requires that video material is provided with depth maps, which requires additional data transmission capacity. Moreover, there is a lot of existing 3D video material that has no depth map data. For such material the destination device may have a stereo-to-depth convertor for generating a generated depth map based on the first and second video information.

It is an object of the invention to provide a system for providing depth information and transferring the depth information that is more flexible for enhancing 3D video rendering.

For this purpose, according to a first aspect of the invention, the source device as described in the opening paragraph, is arranged for providing a source depth map relating to the video information, and the 3D source device comprises a source stereo-to-depth convertor for generating a second generated depth map based on the first and second video information, and a source depth processor arranged for providing depth helper data only when a difference between the source depth map and the second generated depth map exceeds a predetermined threshold, the depth helper data representing the source depth map, and the output unit is arranged for including the depth helper data in the 3D video signal.

The 3D video signal comprises the depth helper data. The 3D destination device comprises a depth processor for generating a destination depth map based on the first generated depth map when no depth helper data is available in the 3D video signal, and based on the depth helper data when depth helper data is available in the 3D video signal.

The measures have the effect that destination device is enabled to generate a destination depth map based on a locally generated depth map from the first and second video information representing the left and right views, and, when and where available, apply the depth helper data to enhance said locally generated depth map. Advantageously the depth helper data is only transferred when the locally generated depth map has a substantial difference with the source depth map. Hence visually disturbing errors caused by incorrectly generated depth maps are reduced.

The invention is also based on the following recognition. The inventors have seen that local depth map generation usually provides a very agreeable result when based on a left and right view. However, at some instants or locations disturbing errors may occur. By predicting the occurrence of such errors at the source, and adding said helper data only for such instants or periods, the amount of additional depth data which must be transferred is limited. Moreover, by transferring the helper data based on the source depth map, and selecting that helper data at the destination side instead of using the erroneous locally generated depth data, a significant improvement of depth based rendering of multiple views is achieved.

Optionally in the 3D source device the output unit is arranged for including the depth helper data in the 3D video signal only for a correction period of time when within the correction period said difference exceeds said threshold. The effect is that the helper data is only transmitted for periods where substantial depth errors occur, which is in practice less than 10% of the time. Advantageously the amount of data to be transferred is reduced.

Optionally in the 3D source device the output unit is arranged for including the depth helper data in the 3D video signal only for a correction area smaller than the 3D display when in the correction area said difference exceeds said threshold. The effect is that the helper data is only transmitted for locations where substantial depth errors occur, which is in practice less than 50% of frames where such errors occur. Advantageously the amount of data to be transferred is reduced.

Optionally in the 3D source device the depth processor is arranged for generating the depth helper data for the correction area so that said correction area is aligned to at least one macroblock in the 3D video signal, the macroblock representing a predetermined block of compressed video data, the macroblock aligned correction area comprising further depth data for locations when the difference between the source depth map and the second generated depth map does not exceed the predetermined threshold. The effect is that the correction area will be efficiently coded by the usual encoding processors, because the encoding is organized in macroblocks. On the contrary, encoding an arbitrary shape only containing corrections for the erroneous depth values, would require a lot of coding effort and result in a low compression rate. Such a correction area also contains pixels for which the depth values of the second generated depth map and the source depth map are small and below the threshold. The further depth data may be based on the second generated depth map for avoiding depth jumps at the outer boundary of the macroblock aligned correction area. Advantageously, making the further depth correction values equal to the generated values will, at the decoder side, avoid that depth differences across macroblocks become visible.

Optionally, in the 3D source device the output unit is arranged for including signaling helper data in the 3D video signal, the signaling helper data indicating the availability of the depth helper data. Advantageously the decoder is enables to easily detect the presence or absence of depth helper data based on the signaling helper data. The signaling helper data may, for example, comprises at least one of:

a flag signal indicating the presence of the depth helper data;

a predefined no-depth value in a depth map indicating the absence of depth helper data for a corresponding location;

helper length data indicative of the amount of depth helper data in a data structure;

view indicator data indicative of a number and/or type of views for which the depth helper data is available;

helper type data indicative of a data structure used for the depth helper data;

helper resolution data indicative of a resolution of the depth helper data;

helper location data indicative of a location of the depth helper data.

Advantageously such signaling helper data indicates the presence and/or amount of depth helper data.

Optionally, in the 3D source device the output unit is arranged for including, in the 3D video signal, a depth map corresponding to a display area on the 3D display, the depth map comprising the depth helper data for the correction area and/or the correction period, and, as the signaling helper data, a predefined no-depth value indicating the absence of depth helper data for a corresponding location for other areas and/or periods. The depth map may be included in the signal for frames that have any depth helper data, i.e. implicitly the presence of the depth map indicating that depth helper data is present. Alternatively, the depth map may be included for all frames. The inventors have noted that current compression scheme very effectively compress depth maps that have a single value over most or even the entire display surface, in particular when the no-depth value indicating the local absence of helper data is chosen to be 0 or 255. Advantageously, at the decoder side, the depth map is processed automatically, only using any correction values when depth values deviate from said no-depth value.

Optionally, the depth map comprises at least one of: depth data corresponding to the left view; depth data corresponding to the right view; depth data corresponding to a center view; depth data having a resolution lower than the first video information or the second video information. Advantageously, by providing one or more depth maps according to said criteria, the decoder may use an appropriate depth map as required.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

It is noted that the current invention may be used for any type of 3D image data, either still picture or moving video. 3D image data is assumed to be available as electronic, digitally encoded, data. The current invention relates to such image data and manipulates the image data in the digital domain.

There are many different ways in which 3D video signal may be formatted and transferred, according to a so-called a 3D video format. Some formats are based on using a 2D channel to also carry stereo information. In the 3D video signal the image is represented by image values in a two-dimensional array of pixels. For example the left and right view can be interlaced or can be placed side by side and above and under. Also a depth map may be transferred, and possibly further 3D data like occlusion or transparency data. A disparity map, in this text, is also considered to be a type of depth map. The depth map has depth values also in a two-dimensional array corresponding to the image, although the depth map may have a different resolution. The 3D video data may be compressed according to compression methods known as such, e.g. MPEG. Any 3D video system, such as internet or a Blu-ray Disc (BD), may benefit from the proposed enhancements.

The 3D display can be a relatively small unit (e.g. a mobile phone), a large Stereo Display (STD) requiring shutter glasses, any stereoscopic display (STD), an advanced STD taking into account a variable baseline, an active STD that targets the L and R views to the viewers eyes based on head tracking, or an auto-stereoscopic multiview display (ASD), etc.

Traditionally all components needed for driving various types of 3D displays are transmitted, which entails typically the compression and transmission of more than one view (camera signal) and its corresponding depths, for example as discussed in "Call for Proposals on 3D Video Coding Technology"—MPEG document N12036, March 2011, Geneva, Switzerland. Problems with such system are the availability of the depth signals (difficult and expensive to create), the limited initial content availability for driving ASD's and advanced STD's for variable baseline, and the additional bitrate required for transmitting the depth signals. Auto-conversion in the decoder (depth automatically derived from stereo) by itself is known, e.g. from "Description of 3D Video Coding Technology Proposal by Disney Research Zurich and Fraunhofer HHI", MPEG document M22668, November 2011, Geneva, Switzerland. However the overall quality cannot be guaranteed and quality will be limited in certain "difficult" scenes (e.g. 5% of the scenes). As an alternative to auto-conversion used after the stereo-video decoder, a stereo-to-depth convertor can also be placed at the encoder side where more processing power can be applied. However this does not reduce the data amount to be transferred and still suffers from some difficult scenes where synthesized depth maps are not reliable.

Figure 1:
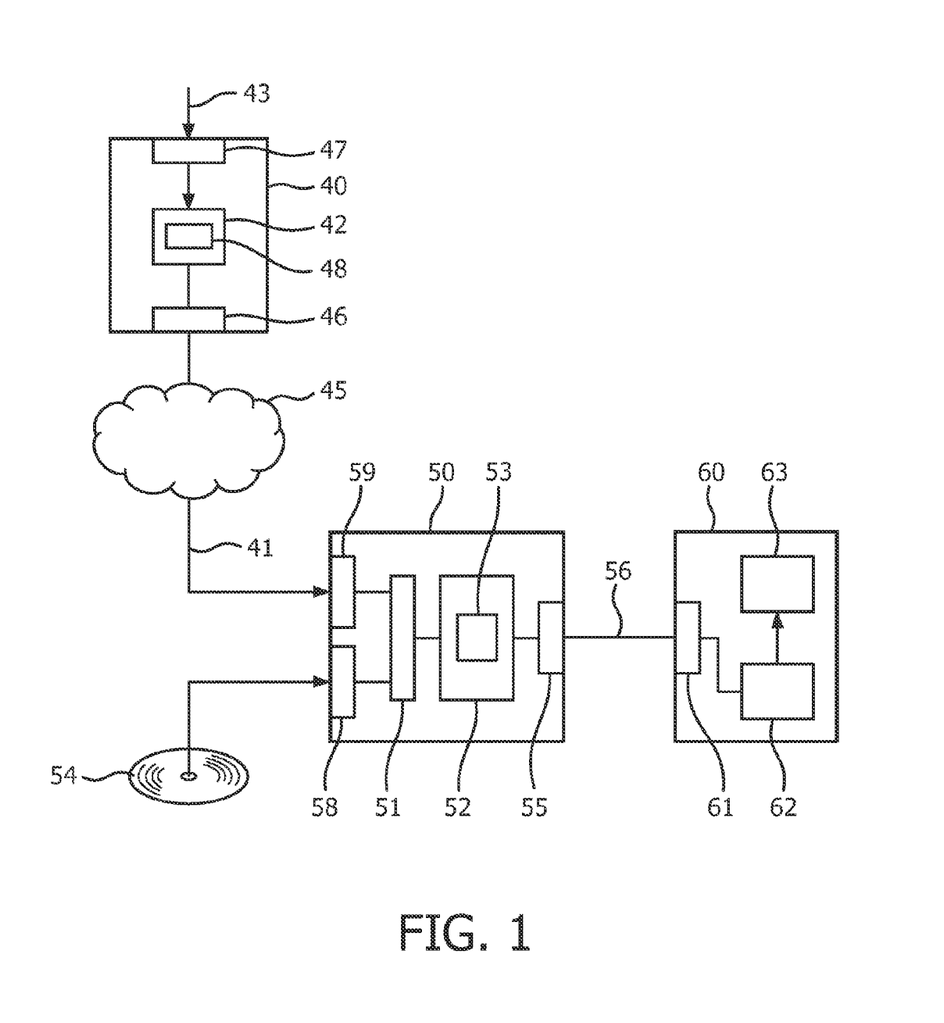
FIG. 1 shows a system for processing 3D video data and displaying the 3D video data.

FIG. 1 shows a system for processing 3D video data and displaying the 3D video data. A first 3D video device, called 3D source device 40, provides and transfers a 3D video signal 41 to a further 3D image processing device, called 3D destination device 50, which is coupled to a 3D display device 60 for transferring a 3D display signal 56. The video signal may for example be a 3D TV broadcast signal such as a standard stereo transmission using ½ HD frame compatible, multi view coded (MVC) or frame compatible full resolution (e.g. FCFR as proposed by Dolby). Building upon a frame-compatible base layer, Dolby developed an enhancement layer to recreate the full resolution 3D images. This technique has been proposed to MPEG for standardization and requires only a ~10% increase in bitrate. The traditional 3D video signal is enhanced by depth helper data as elucidated below.

FIG. 1 further shows a record carrier 54 as a carrier of the 3D video signal. The record carrier is disc-shaped and has a track and a central hole. The track, constituted by a pattern of physically detectable marks, is arranged in accordance with a spiral or concentric pattern of turns constituting substantially parallel tracks on one or more information layers. The record carrier may be optically readable, called an optical disc, e.g. a DVD or BD (Blu-ray Disc). The information is embodied on the information layer by the optically detectable marks along the track, e.g. pits and lands. The track structure also comprises position information, e.g. headers and addresses, for indication the location of units of information, usually called information blocks. The record carrier 54 carries information representing digitally encoded 3D image data like video, for example encoded according to the MPEG2 or MPEG4 encoding system, in a predefined recording format like the DVD or BD format.

The 3D source device has a source depth processor 42 for processing 3D video data, received via an input unit 47. The input 3D video data 43 may be available from a storage system, a recording studio, from 3D camera's, etc. The source system processes a depth map provided for the 3D image data, which depth map may be either originally present at the input of the system, or may be automatically generated by a high quality processing system as described below, e.g. from left/right frames in a stereo (L+R) video signal or from 2D video, and possibly further processed or corrected to provide a source depth map that accurately represents depth values corresponding to the accompanying 2D image data or left/right frames.

The source depth processor 42 generates the 3D video signal 41 comprising the 3D video data. The 3D video signal has first video information representing a left eye view on a 3D display, and second video information representing a right eye view on a 3D display. The source device may be arranged for transferring the 3D video signal from the video processor via an output unit 46 and to a further 3D video device, or for providing a 3D video signal for distribution, e.g. via a record carrier. The 3D video signal is based on processing input 3D video data 43, e.g. by encoding and formatting the 3D video data according to a predefined format.

The 3D source device has a source stereo-to-depth convertor 48 for generating a source generated depth map based on the first and second video information, and a source depth processor 42 for providing depth helper data.

A stereo-to-depth convertor for generating a depth map, in operation, receives a stereo 3D signal, also called left-right video signal, having a time-sequence of left frames L and right frames R representing a left view and a right view to be displayed for respective eyes of a viewer for generating a 3D effect. The unit produces a generated depth map by disparity estimation of the left view and the right view, and may further provide a 2D image based on the left view and/or the right view. The disparity estimation may be based on motion estimation algorithms used to compare the L and R frames. Large differences between the L and R view of an object are converted into depth values before or behind the display screen in dependence of the direction of the difference. The output of the generator unit is the generated depth map. Subsequently, the depth helper data is generated where depth errors are detected, i.e. only when a difference between the source depth map and the generated depth map exceeds a predetermined threshold. For example, a predetermined depth difference may constitute said threshold. The threshold may also be made dependent on further image properties which affect the visibility of depth errors, e.g. local image intensity or contrast, or texture. The threshold may also be determined by detecting a quality level of the generated depth map as follows. The generated depth map is used to warp a view having the orientation corresponding to a given different view. For example, an R' view is based on the original L image data and the generated depth map. Subsequently a difference is calculated between the R' view and the original R view, e.g. by the well known PSNR function (Peak Signal-to-Noise Ratio). PSNR is the ratio between the maximum possible power of a signal and the power of corrupting noise that affects the fidelity of its representation. Because many signals have a very wide dynamic range, PSNR is usually expressed in terms of the logarithmic decibel scale. The PSNR may be used now as a measure of quality of generated depth map. The signal in this case is the original data R, and the noise is the error introduced by warping R' based on the generated depth map. Furthermore, the threshold may also be judged based on further visibility criteria, or by an editor authoring or reviewing the results based on the generated depth map, and controlling which sections and/or periods of the 3D video need to be augmented by depth helper data The depth helper data represents the source depth map, for example depth values of the source depth map at the locations of said depth errors. Alternatively a depth difference or a depth correction factor may be included in the depth helper data to indicate to the destination device how to arrive at the depth values of the source depth map. The output unit 46 is arranged for including the depth helper data in the 3D video signal. A processor unit having the functions of the depth processor 42, the stereo-to-depth convertor 48 and the output unit 46 may be called a 3D encoder.

The 3D source may be a server, a broadcaster, a recording device, or an authoring and/or production system for manufacturing optical record carriers like the Blu-ray Disc. The Blu-ray Disc provides an interactive platform for distributing video for content creators. Information on the Blu-ray Disc format is available from the website of the Blu-ray Disc association in papers on the audio-visual application format, e.g. http://www.blu-raydisc.com/Assets/Downloadablefile/ 2b_bdrom_audiovisualapplication_030 5-12955-15269.pdf. The production process of the optical record carrier further comprises the steps of providing a physical pattern of marks in tracks which pattern embodies the 3D video signal that include the depth helper data, and subsequently shaping the material of the record carrier according to the pattern to provide the tracks of marks on at least one storage layer.

The 3D destination device 50 has an input unit 51 for receiving the 3D video signal 41. For example the device may include an optical disc unit 58 coupled to the input unit for retrieving the 3D video information from an optical record carrier 54 like a DVD or Blu-ray disc. Alternatively (or additionally), the device may include a network interface unit 59 for coupling to a network 45, for example the internet or a broadcast network, such device being a set-top box or a mobile computing device like a mobile phone or tablet computer. The 3D video signal may be retrieved from a remote website or media server, e.g. the 3D source device 40. The 3D image processing device may be a converter that converts an image input signal to an image output signal having the required depth information. Such a converter may be used to convert different input 3D video signals for a specific type of 3D display, for example standard 3D content to a video signal suitable for auto-stereoscopic displays of a particular type or vendor. In practice, the device may be a 3D optical disc player, or a satellite receiver or set top box, or any type of media player.

The 3D destination device has a depth processor 52 coupled to the input unit 51 for processing the 3D information for generating a 3D display signal 56 to be transferred via an output interface unit 55 to the display device, e.g. a display signal according to the HDMI standard, see "High Definition Multimedia Interface; Specification Version 1.4a of Mar. 4, 2010", the 3D portion of which being available at http://hdmi.org/manufacturer/specification.aspx for public download.

The 3D destination device has a stereo-to-depth convertor 53 for generating a destination generated depth map based on the first and second video information. The operation of the stereo-to-depth convertor is equivalent to the stereo-to-depth convertor in the source device described above. When both converters are equal, the same depth errors will occur, which errors are correctable via the depth helper data. If the destination stereo-to-depth convertor is further improved, i.e. performs at least as good as the source stereo-to-depth convertor, the final destination depth map will benefit where no helper data is available. A unit having the functions of the destination depth processor 52, the stereo-to-depth convertor 53 and the output unit 55 may be called a 3D decoder.

The destination depth processor 52 is arranged for generating the image data included in the 3D display signal 56 for display on the display device 60. The depth processor is arranged for generating a destination depth map based on the destination generated depth map when no depth helper data is available in the 3D video signal, and based on the depth helper data when depth helper data is available in the 3D video signal. For example a depth switcher may replace the depth values of the destination generated depth map by the depth values provided by the depth helper data, where available. The processing of depth helper data is further elucidated below.

The 3D display device 60 is for displaying the 3D image data. The device has an input interface unit 61 for receiving the 3D display signal 56 including the 3D video data and the destination depth map transferred from the 3D destination device 50. The device has a view processor 62 for generating multiple views of the 3D video data based on the first and second video information in dependence of the destination depth map, and a 3D display 63 for displaying the multiple views of the 3D video data. The transferred 3D video data is processed in the processing unit 62 for displaying on the 3D display 63, for example a multiview LCD. The display device 60 may be any type of stereoscopic display, also called 3D display.

The video processor 62 in the 3D display device 60 is arranged for processing the 3D video data for generating display control signals for rendering multiple views. The views are generated from the 3D image data using the destination depth map. Alternatively the video processor 52 in a 3D player device may be arranged to perform said depth map processing. The multiple views generated for the specified 3D display may be transferred with the 3D image signal towards said 3D display.

In a further embodiment the destination device and the display device are combined into a single device. The functions of the depth processor 52 and the processing unit 62, and the remaining functions of output unit 55 and input unit 61, may be performed by a single video processor unit.

Figure 2:
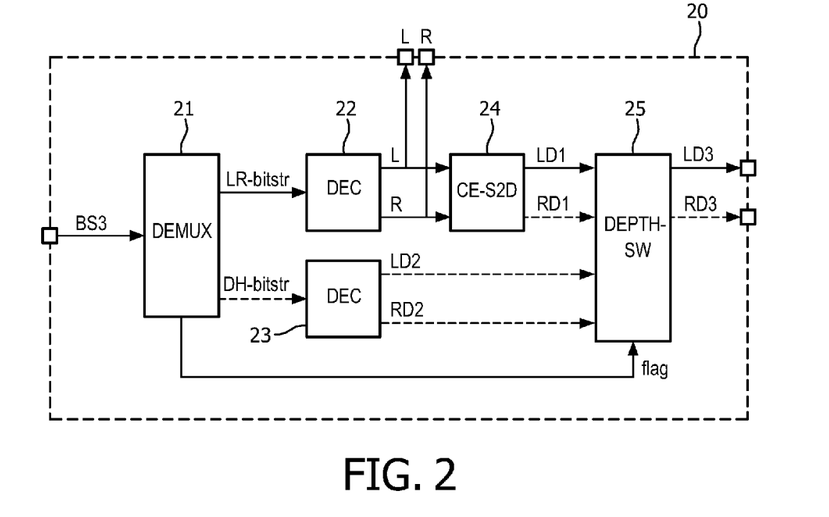
FIG. 2 shows a 3D decoder using depth helper data.

FIG. 2 shows a 3D decoder using depth helper data. A 3D decoder 20 is schematically shown having an input for a 3D video signal marked BS3 (base signal 3D). An input demuliplexer 21 (DEMUX) retrieves bitstreams from the left and right view (LR-bitstr) and the depth helper data (DH-bitstr). A first decoder 22 (DEC) decodes the left and right view to outputs L and R, which are also coupled to a consumer type stereo-to-depth convertor (CE-S2D), which generates a left depth map LD1 and a right depth map RD1, called the destination generated depth map. A second decoder 23 decodes the DH-bitstr and provides a left helper depth map LD2 and a right helper depth map RD2 where the depth helper data is available. A depth switcher DEPTH-SW 25 selects either the destination generated depth map (LD1/ RD1) or the left helper depth map LD2 and the right helper depth map RD2, e.g. based on a flag indicating the presence of depth helper data.

The 3D decoder may be part of a set top box (STB) at consumer side, which receives the bitstream according the depth helper system (BS3), which is de-multiplexed into 2 streams: one video stream having L and R views, and one depth stream having depth helper (DH) data which are then both send to the respective decoders (e.g. MVC/H264). A local flag is derived and used to switch between the decoded DH depths (LD2/RD2) and the local generated (by CE-S2D) depth values (LD1/RD1). The final outputs of the 3D decoder (LD3/RD3) are then transferred to a view-warping block as discussed with FIG. 4 or 5 depending on the type of display.

Figure 3:
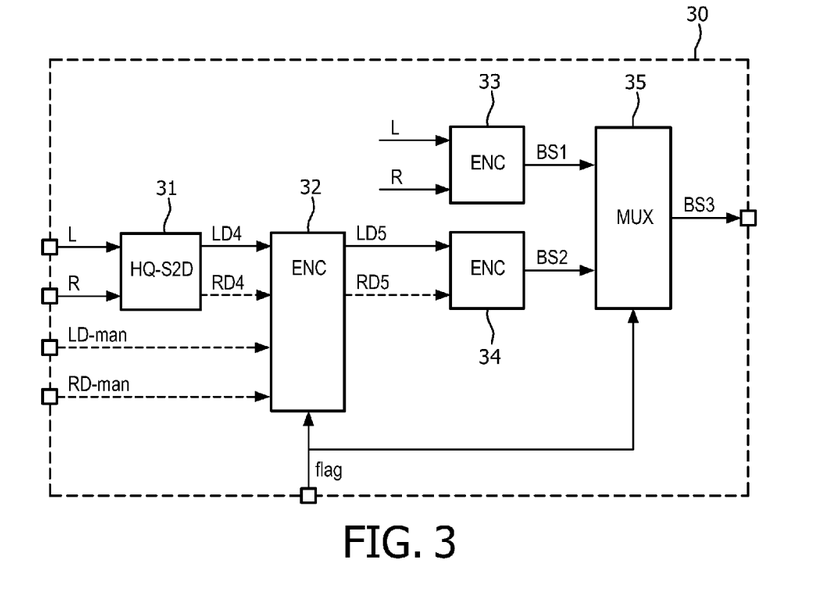
FIG. 3 shows a 3D encoder providing depth helper data.

FIG. 3 shows a 3D encoder providing depth helper data. A 3D encoder 30 is schematically shown having an input (L, R) for receiving a 3D video signal. A stereo-to-depth convertor (e.g. a high-quality professional type HQ-S2D) generates a left depth map LD4 and a right depth map RD4, called the source generated depth map. A further input receives a source depth map (marked LD-man, RD-man), which may be provided off-line (e.g. manually edited or improved), or may be available with the input 3D video signal. A depth switcher unit 32 receives both the source generated depth map LD4, RD4 and the source depth map LD-man and RD-man and determines whether the difference between the source depth map and the generated depth map exceeds a predetermined threshold. If so, the depth switches generates the depth helper data LD5, RD5. The depth switcher may select one of the depth maps. The selection may also be based on an external signal (marked flag) that indicates such difference, which signal may be included in the output signal as helper signaling data by output multiplexer 35 (MUX). The multiplexer also receives the encoded video data (BS1) from a first encoder 33 and the encoded depth helper data (BS2) from a second encoder 34, and generates the 3D video signal marked BS3.

In the 3D encoder the output unit may be arranged for including the depth helper data in the 3D video signal only for a correction period of time when within the correction period said difference exceeds said threshold. Furthermore, the output unit may be arranged for including the depth helper data in the 3D video signal only for a correction area smaller than the 3D display when in the correction area said difference exceeds said threshold. For example, a depth map providing the depth helper data is (i) full-frame, (ii) partially present, or (iii) not present. Also the depth map can be present in only certain frames or GOPs. Also, a full-frame depth-map may be included, but having a particular luminance value (e.g. 0x00 or 0xFF) assigned to mean "no depth helper information". Such a map can be coded in a backwards-compatible way. Also depth helper data and their frame-location may be stored in a table or other data structure, transmitted in user-data or in some other stream.

The encoder has the following effect. Depth information called depth helper data is partially transmitted both in time (partial depths in time) and/or spatially (partial depth within the frames). There is an explicit or implicit mechanism included for indicating when these partial depths are to be used or when the depths must be automatically generated locally. An explicit mechanism may be via the insertion of flags into the bitstream, and implicit may be via the convention that the absence of depth helper data as such indicates that local depth must be generated.

In an embodiment, in a depth map a certain depth level LEV (eg the black level 0 or that white level 255) may be assigned the meaning that no DH-depth is transmitted. Such no-depth value is physically present at the position of the depth value, which has some practical advantages, e.g. to keep video and depth synchronous.

Also such signaling allows "spatial" indication of depth helper data, so not only partially temporal but also partially spatial, i.e. only parts within a frame. For example depth errors may be present in some parts of the local generated depth map within a frame of a particular shot. In that case the depth helper data will be set at the no-depth level LEV, except for the pixels where the local generated depth was inadequate.

An example where depth errors may occur, are logo's which are constantly present in the content, also over shot boundaries. Usually the mapping of disparities to depths would be different for each shot, while typically the disparities of the logo's are constant. Local generated depth may be erroneous so that the depths of the logo vary in time over the shots. Due to the nature of ASD's this also may even result in a somewhat varying blurring effect, for which the human eye is very sensitive. However the depth helper data, available (i.e. at a non LEV value) only for those depth pixels corresponding to the logo, enables to set the logo depth to a fixed and appropriate level. Hence such quality problems are overcome. Depth map values being non LEV will be interpreted as a flag and for those pixels, the depth output (LD3/RD3) will be switched from local generated depths LD1/RD1 to depth helper data LD2/RD2.

The behavior of stereo-to-depth convertor module S2D (CE-S2D or HQ-S2D), which converts the standard available stereo signal into one or two corresponding depth signals, is known (and fixed). Advantageously, a specific stereo-to-depth convertor is specifically chosen to be part of a standard 3D format. Hence the stereo-to-depth convertor at the decoder side may then be made equal to the stereo-to-depth convertor at the encoder side. This allows quality control at encoder side of the S2D module in the decoder, CE-S2D. If it turns out to be e.g. that for a given shot (start of the new scene or "take") the quality after rendering on an ASD would be insufficient (something which typically would only happen once in a while, say 5% of the shots), only for those shots the depth helper data is created and transmitted. This not only ensures the overall quality, but also limits the costs of creating the content, while at the same time saving bits to transmit.

It is noted that the depth helper data principle can be applied at every 3D video transfer step, e.g. between a studio or author and a broadcaster who further encodes the now enhanced depth maps for transmitting to a consumer. Also the depth helper data system may be executed on consecutive transfers, e.g. a further improved version may be created on an initial version by including second depth helper data based on a further improved source depth map. This gives great flexibility in terms of achievable quality on the 3D displays, bitrates needed for the transmission of depth information or costs for creating the 3D content.

In an embodiment the depth helper data may take the following form. The 3D video signal includes a depth map corresponding to a display area on the 3D display. Said depth map has the depth helper data for the correction area and/or the correction period. Furthermore, a predefined no-depth value indicates the absence of depth helper data for a corresponding location for other areas and/or periods.

In an embodiment, the depth map may include at least one of depth data corresponding to the left view, depth data corresponding to the right view, and/or depth data corresponding to a center view. Also, the depth data may have a resolution lower than the first video information or the second video information.

The depth processor may be arranged for generating the depth helper data for the correction area so that said correction area is aligned to at least one macroblock in the 3D video signal. The macroblocks represent a predetermined block of compressed video data, e.g. in an MPEG encoded video signal.

The macroblock aligned correction area may include further depth data for locations when the difference between the source depth map and the second generated depth map does not exceed the predetermined threshold. Such a correction area also contains pixels for which the depth values of the second generated depth map and the source depth map are small and below the threshold. The further depth data may be based on the second generated depth map for avoiding depth jumps at the outer boundary of the macroblock aligned correction area. Making the further depth correction values equal to the generated values will, at the decoder side, avoid that depth differences across macroblocks become visible.

In an embodiment the 3D video signal contains signaling helper data. The signaling helper data indicates the availability of the depth helper data. The signaling helper data may take the form of at least one of the following. A flag signal may indicate the presence of the depth helper data. A predefined no-depth value in a depth map may indicate the absence of depth helper data for a corresponding location. Helper length data may indicate the amount of depth helper data in a data structure. View indicator data may indicate of a number and/or type of views for which the depth helper data is available. Helper type data may indicate a data structure or data format used for the depth helper data. Helper resolution data may indicate a resolution of the depth helper data. Helper location data may indicate a location of the depth helper data.

It is note that the depth helper data is intended to assist/correct those areas of the automatically generated depth map that may cause errors in the output after rendering. The unused areas of the depth map may be indicated by a single luminance value. This value we refer to as NoDH.

Other signaling parameters, which may be transferred (one or more, including various combinations) for the depth helper data are:
1. Depth data interpretation,
    a. Zfar, znear (closest and farthest depth values),
    b. znear_sign (indicates how to interpret the znearvalue 0 as positive, 1 as negative
    c. znear_exponent (for extension to a greater fidelity of depth values
    d. num_of_views (the number of views for which depth information is present)
2. Specific processing signaling to aid the rendering in getting the best results out of the depth helper data. The signaling will consist of a number that corresponds with the signaling used in a defined table
    a. The type of scaling used in the DH data, the kind of algorithm used for scaling, bi-linear, bicubic etc.
    b. Type of edges in the depth information. This will consist of a table indicating a certain type of edge to aid the renderer in getting the maximum results out of the depth helper data. For example Sharp, Fuzzy, Soft etc
    c. The algorithm used to generate the depth helper data. The rendering system will be able to interpret this value and from this infer how to render the depth helper data.
       Manual, depth from focus, depth from perspective, depth from motion, a combination of approaches etc. etc.
       In addition to the table entry values listed above the following additional real values:
    d. The amount of dilation used at borders of objects in the depth data, from 0 to 128
    e. The luminance value in the depth image data that contains no Depth helper data. NoDH as a value between 0 and 255. To minimize the bitrate at the edges this must be block aligned at for example 8×8 or 16×16, corresponding to the macroblock size of the depth video stream.

Both the Depth data interpretation (1) and the specific processing signaling for rendering (2) is preferably transmitted such that they are contained in the video signal, in the video elementary stream. For transmission of Depth data interpretation it has been proposed to define a new nal unit type for this called depth range update.

As to the specific processing signaling data also needs to used when interpreting the depth helper data we propose to carry the signaling in the NAL units that form part of the video stream that carries the depth helper data. For these we can extend the depth_range_update nal unit with a table which we define as Rendering_Depth_Helper data. Alternatively the table below may be carried in a SEI message as these are also carried in the video elementary stream.

Below is a table that shows an example of part of a nal unit with the data as indicated.

TABLE 1

| rendering depth helper data | |
|---|---|
| Rendering_depth_helper_data { | bits |
| Type_of_scaling | 4 |
| Type_of_edge | 4 |
| Depth_algorithm | 4 |
| Dilation | 7 |
| No_Depth_Helper_value | 8 |
| Reserved | 5 |
| } | |

| Type_of_scaling | Scaling method used |
|---|---|
| 1 | Bi-linear |
| 2 | Bi-cubic |
| 3 | Etc. |

| Type_of_edges | Edge type |
|---|---|
| 1 | Sharp |
| 2 | Fuzzy |
| 3 | Soft |
| 4 | Etc. |

| Type_of_depth_algo | Depth algorithm used |
|---|---|
| 1 | Manual |
| 2 | Depth from motion |
| 3 | Depth from focus |
| 4 | Depth from perspective |
| 5 | Etc. |

In an embodiment the 3D video signal is formatted to include an encoded video data stream and arranged for conveying decoding information according to a predefined standard, for example the BD standard. The signaling helper data in the 3D video signal is included according to the standard as decoding information, in at least one of a user data message; a signaling elementary stream information [SEI] message; an entry point table; or an XML based description.

Figure 4:
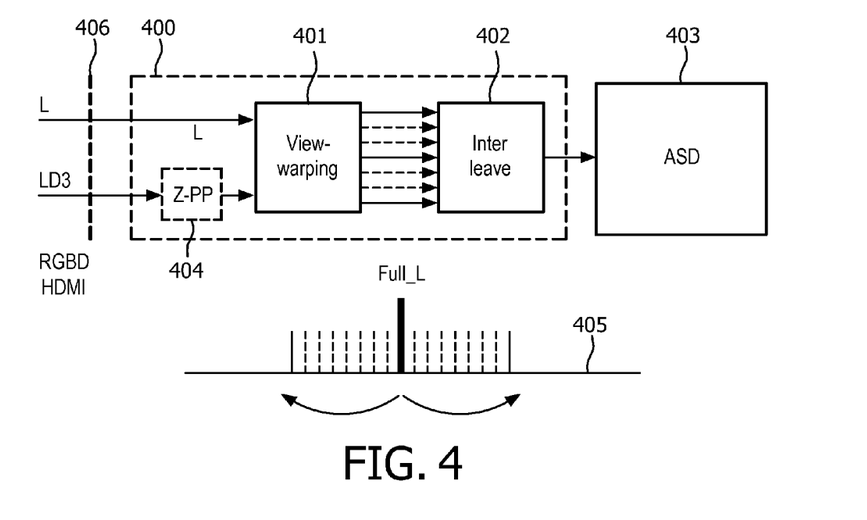
FIG. 4 shows an auto-stereo display device and generating multiple views.

FIG. 4 shows an auto-stereo display device and generating multiple views. An auto-stereo display (ASD) 403 receives multiple views generated by a depth processor 400. The depth processor has a view warping unit 401 for generating a set of views 405 from a full left view L and the destination depth map LD3, as shown in the lower part of the Figure. The display input interface 406 may be according to the HDMI standard, extended to transfer RGB and Depth (RGBD HDMI), and include the full left view L and the destination depth map LD3 based on the depth helper data HD. The views as generated are transferred via an interleave unit 402 to the display 403. The destination depth map may be further processed by a depth post processor Z-PP 404.

Figure 5:
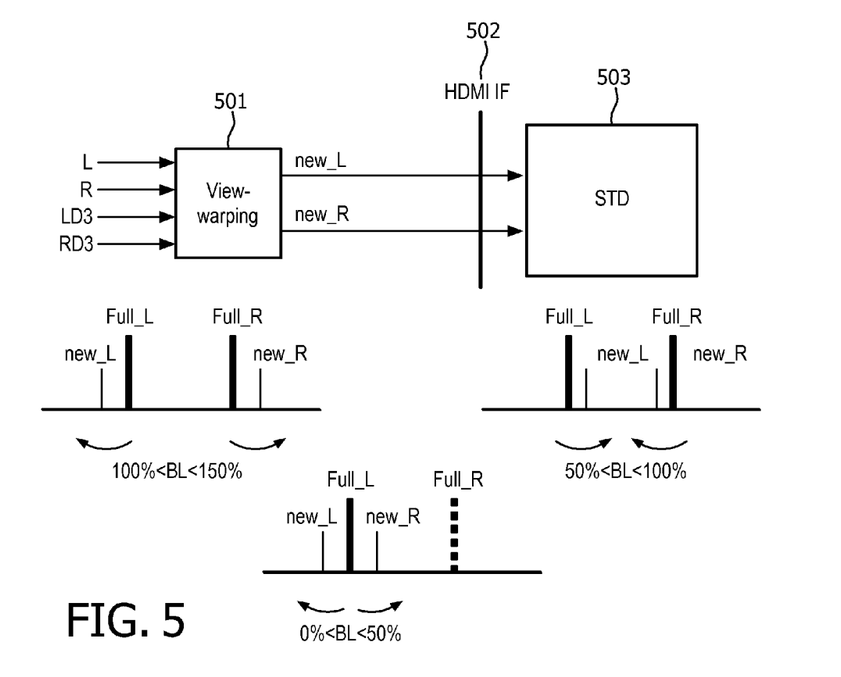
FIG. 5 shows a dual view stereo display device and generating enhanced views.

FIG. 5 shows a dual view stereo display device and generating enhanced views. A dual-view stereo display (STD) 503 receives two enhanced views (new_L, new_R)

generated by a depth processor 501. The depth processor has a view warping function for generating enhanced views from the original full left view L and the full R view and the destination depth map, as shown in the lower part of the Figure. The display input interface 502 may be according to the HDMI standard, extended to transfer view information IF (HDMI IF). The new views are warped with respect to a parameter BL indicative of the base line (BL) during display. The baseline of 3D video material is originally the effective distance between the L and R camera positions (corrected for optics, zoom factor, etc). When displaying material the baseline will effectively be translated by the display configuration such as size, resolution, viewing distance, or viewer preference settings. To change the baseline during display the positions of the L and R view may be shifted by warping new views, called new_L and new_R, forming a new baseline distance that may be larger (>100%) or smaller (<100%) than the original baseline. The new views are shifted outwards or inwards with respect to the original full L and R views at BL=100%. The third example (0%<BL<50%) has both new views warped based on a single view (Full_L). Warping the new views close to the full views avoids warping artifacts. By the three examples shown the distance between the warped new view and the original view is lower than 25%, while enabling a control range of 0%<BL<150%.

Figure 6:
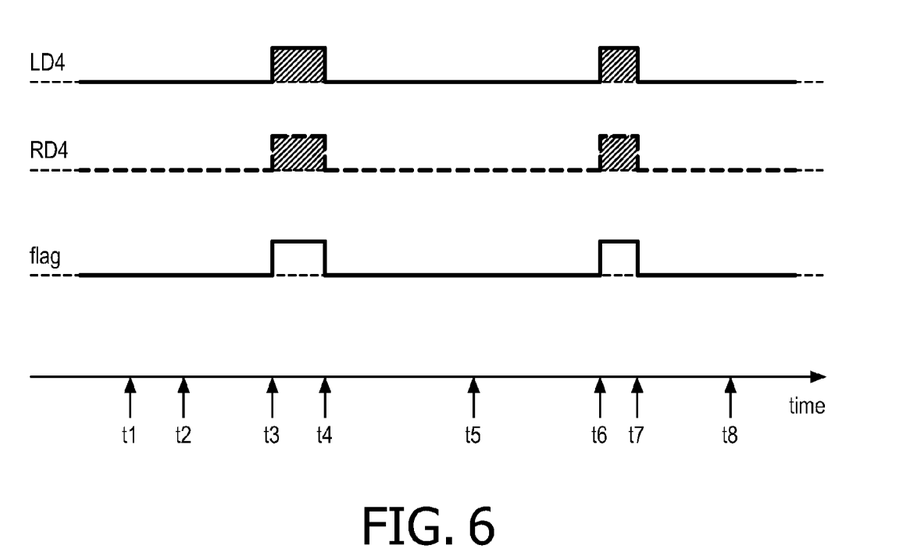
FIG. 6 shows presence of depth helper data in a 3D video signal.

FIG. 6 shows presence of depth helper data in a 3D video signal. In the Figure an upward arrow indicates the start time (t1, t2, etc) of a new shot in a video program. During the shots starting at t3 and t6 depth helper data LD4 and RD4 is generated, as indicated by the flag signal going high. The Figure illustrates including the depth helper data in the 3D video signal only for a correction period of time when within the correction period said difference exceeds a threshold, i.e. where the depth errors in a locally generated depth map are disturbingly visible.

Although the invention has been mainly explained by embodiments using consumer type destination devices, the invention is also suitable for any 3D video system. In summary, a hybrid transmission/auto-conversion 3D format and scheme for transmission of 3D data towards various types of 3D displays is proposed. Depth information ("depths") is partially transmitted both in time (partial depths in time) and/or spatially (partial depth within the frames). There is an explicit or implicit mechanism for indicating when these partial depths are to be used or when the depths must be automatically generated locally. The hybrid principle can be applied either at the consumer side and/or at broadcaster side, which gives great flexibility in terms of achievable quality on the 3D displays, bitrates needed for the transmission of depth information or costs for creating the 3D content.

It is to be noted that the invention may be implemented in hardware and/or software, using programmable components. A method for implementing the invention has the steps corresponding to the functions defined for the system as described with reference to FIG. 1.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A three dimensional source device for transferring a three dimensional video signal to a three dimensional destination device, the three dimensional source device comprising:
   an output circuit arranged to generate the three dimensional video signal, wherein the output circuit is arranged to transfer the three dimensional video signal to the three dimensional destination device,
   wherein the three dimensional source device is arranged to provide a source depth map relating to the three dimensional video signal,
   wherein the three dimensional video signal comprises:
      a first video information representing a left eye view on a three dimensional display; and
      a second video information representing a right eye view on the three dimensional display,
   a source stereo-to-depth convertor circuit arranged to generate a second generated depth map based on first video information and the second video information; and
   a source depth processor circuit arranged to provide a depth helper data only when a difference between the source depth map and the second generated depth map exceeds a predetermined threshold,
      wherein the depth helper data represents the source depth map,
      wherein the output circuit is arranged to include the depth helper data in the three dimensional video signal,
   wherein the three dimensional destination device comprises:
      a receiver circuit for receiving the three dimensional video signal;
      a stereo-to-depth convertor circuit arranged to generate a first generated depth map based on the first video information and the second video information,
   a depth processor circuit for generating a destination depth map based on the first generated depth map when none of the depth helper data is available in the three dimensional video signal, and based on the depth helper data when the depth helper data is available in the three dimensional video signal.

2. The three dimensional source device as claimed in claim 1, wherein the output circuit is arranged to include the depth helper data in the three dimensional video signal only for a correction period of time when within the correction period of time the difference between the source depth map and the second generated depth map exceeds the predetermined threshold.

3. The three dimensional source device as claimed in claim 1, wherein the output circuit is arranged to include the depth helper data in the three dimensional video signal only for a correction area smaller than the three dimensional display when in the correction area the difference between the source depth map and the second generated depth map exceeds the predetermined threshold.

4. The three dimensional source device as claimed in claim 3,
wherein the depth processor circuit is arranged to generate the depth helper data for the correction area so that the correction area is aligned to at least one macroblock in the three dimensional video signal,
wherein the macroblock represents a predetermined block of compressed video data,
wherein the macroblock aligned correction area comprises further depth data for locations when the difference between the source depth map and the second generated depth map does not exceed the predetermined threshold.

5. The three dimensional source device as claimed in claim 1,
wherein the output circuit is arranged to include signaling helper data in the three dimensional video signal,
wherein the signaling helper data indicates the availability of the depth helper data.

6. The three dimensional source device as claimed in claim 5, wherein the signaling helper data comprises at least one of:
a flag signal indicating the presence of the depth helper data;
a predefined no-depth value in a depth map indicating the absence of the depth helper data for a corresponding location;
a helper length data indicative of the amount of the depth helper data in a data structure;
a view indicator data indicative of a number and/or type of views for which the depth helper data is available;
a helper type data indicative of a data structure used for the depth helper data;
a helper resolution data indicative of a resolution of the depth helper data;
a helper location data indicative of a location of the depth helper data.

7. The three dimensional source device as claimed in claim 5,
wherein the output circuit is arranged to include in the three dimensional video signal, a depth map corresponding to a display area on the three dimensional display,
wherein the depth map comprises the depth helper data for the correction area and/or the correction period,
wherein the depth map comprises a predefined no-depth value indicating the absence of depth helper data for a corresponding location for other areas and/or other periods.

8. A three dimensional destination device to receive three dimensional video signal from a three dimensional source device, the three dimensional destination device comprising:
a receiver circuit for receiving the three dimensional video signal;
a stereo-to-depth convertor circuit for generating a first generated depth map based on a first and a second video information; and
a depth processor circuit for generating a destination depth map based on the first generated depth map when none of a depth helper data is available in the three dimensional video signal, and based on the depth helper data when the depth helper data is available in the three dimensional video signal
wherein the three dimensional video signal comprises:
a first video information representing a left eye view on a three dimensional display; and
a second video information representing a right eye view on the three dimensional display,
wherein the three dimensional source device is arranged to provide a source depth map relating to the three dimensional video signal,
wherein the three dimensional source device comprises:
a source stereo-to-depth convertor circuit for generating a second generated depth map based on the first and second video information; and
a source depth processor circuit arranged to provide the depth helper data only when a difference between the source depth map and the second generated depth map exceeds a predetermined threshold,
wherein the depth helper data represents the source depth map,
wherein the output circuit is arranged to include the depth helper data in the three dimensional video signal.

9. The destination device as claimed in claim 8,
wherein the receiver circuit comprises a read circuit arranged to read a record carrier,
wherein the record carrier comprises the three dimensional video signal.

10. The destination device as claimed in claim 8, further comprising:
a view processor circuit arranged to generate multiple views of the three dimensional video data based on the first video information and the second video information and in dependence of the destination depth map;
a three dimensional display arranged to display the multiple views of the three dimensional video data.

11. A method of transferring a three dimensional video signal to a three dimensional destination device,
wherein the three dimensional video signal comprises a first video information representing a left eye view on three dimensional display, and a second video information representing a right eye view on the three dimensional display,
wherein the three dimensional destination device comprises a receiver circuit arranged to receive the three dimensional video signal, a stereo-to-depth convertor circuit arranged to generate a first generated depth map based on the first video information and the second video information, a depth processor circuit, the method comprising:
generating the three dimensional video signal,
transferring the three dimensional video signal to the three dimensional destination device,
providing a source depth map relating to the video information,
generating a second generated depth map based on the first video information and the second video information,
providing a depth helper data only when a difference between the source depth map and the second generated depth map exceeds a predetermined threshold,
wherein the depth helper data represents the source depth map, wherein the depth helper data is included in the three dimensional video signal, wherein the depth processor generates a destination depth map based on the first generated depth map when none of the depth helper data is available in the three dimensional video signal, and based on the depth helper data when the depth helper data is available in the three dimensional video signal.

12. The method as claimed in claim 11, the method further comprising manufacturing a record carrier, the record carrier comprising a track representing the three dimensional video signal.

13. A non-transitory computer readable medium comprising a three dimensional video signal for transferring three dimensional video data from three dimensional a source device to a 3D destination device, the three dimensional video signal comprising:

first video information representing a left eye view on a three dimensional display, second video information representing a right eye view on the three dimensional display, wherein the three dimensional destination device comprises:
  receiver circuit for receiving the three dimensional video signal, and
  a stereo-to-depth convertor circuit arranged to generate a first generated depth map based on the first video information and the second video information,
  a depth processor circuit arranged to generate a destination depth map based on the first generated depth map when none of a depth helper data is available in the three dimensional video signal, and based on the depth helper data when the depth helper data is available in the three dimensional video signal;

wherein the three dimensional source device comprises:
  an output circuit arranged to generate the three dimensional video signal, wherein the output circuit is arranged to transfer the three dimensional video signal to the three dimensional destination device,
  wherein the three dimensional source device is arranged to provide a source depth map relating to the three dimensional video signal,
  a source stereo-to-depth convertor circuit arranged to generate a second generated depth map based on the first video information and the second video information, and
  a source depth processor circuit arranged to provide the depth helper data only when a difference between the source depth map and the second generated depth map exceeds a predetermined threshold,
  wherein the depth helper data represents the source depth map,
wherein the three dimensional video signal comprises the depth helper data; and the depth helper data.

14. A non-transitory computer readable medium comprising a computer program, the computer program arranged to provide a three dimensional video signal for transferring to a three dimensional destination device, wherein the computer program is operative to cause a processor circuit to perform the respective steps of the method as claimed in claim 11.

* * * * *